Jan. 19, 1971 H. MEITINGER 3,555,810

HOROLOGICAL INDEXING DEVICE

Filed Dec. 29, 1969 2 Sheets-Sheet 1

INVENTOR.
HEINZ MEITINGER
BY
Richard H. Joel
ATTORNEY.

HOROLOGICAL INDEXING DEVICE

Filed Dec. 29, 1969 2 Sheets-Sheet 2

INVENTOR.
HEINZ MEITINGER
BY Richard A. Joel
ATTORNEY.

United States Patent Office 3,555,810

Patented Jan. 19, 1971

3,555,810

HOROLOGICAL INDEXING DEVICE

Heinz, Meitinger, Pforzheim, Germany, assignor to Timex Corporation, Waterbury, Conn., a corporation of Connecticut Filed Dec. 29, 1969, Ser. No. 888,596

Int. Cl. G04c *3/00, 3/04;* G04b *15/00*

U.S. Cl. 58—23 15 Claims

ABSTRACT OF THE DISCLOSURE

A horological instrument includes a mechanical oscillator. The mechanical oscillator is connected to a cantilevered flat spring which carries indexing means, such as jewels or pins. The indexing means progresses an index wheel.

This invention relates to a mechanical oscillator for driving an index wheel of a horological device and, in particular, the invention relates to the indexing system of an electrically powered wrist watch.

The historical goal of horological devices has been accurate timekeeping. In the instant invention, a mechanically simple rockable oscillator is used to operate the index wheel of a watch, in particular a wrist watch. This arrangement is characterized by two desirable features. It requires a small amount of electrical power for operation as its amplitude of oscillation is relatively low. It is structurally simple in design and operation and thus inexpensive and reliable in application and use.

The aforesaid rocking oscillator may be only nominally accurate as a timekeeping device, due to its relatively low amplitude of oscillation. Consequently, its operation is regulated by an electronic synchronizing system, to impart high accuracy to the entire timekeeping system without any appreciable sacrifice to the aforesaid features of low electrical power requirement and economy.

Conventional balance wheel oscillators have, for timekeeping reasons, a relatively high amplitude of oscillation, for example, 540° full oscillation. Many indexing devices have been proposed and developed for that type of oscillator. However, generally they will not operate with the low amplitude oscillator of the present device, which, for example, may have a full oscillation of only 30°.

It is therefore a principal objective of this invention to provide a horological device wherein the index wheel is progressed by a rockable mechanical oscillator having a relatively low amplitude of oscillation.

It is a further objective of the present invention to provide an indexing means which directly acts upon, and rotates, the seconds wheel, thereby eliminating the need for an intermediate wheel and staff.

It is a further objective of the invention to drive the oscillator with a low cycle per second pulse signal and secure horological accuracy by regulating the oscillation with a higher cycle per second synchronizing signal from an accurate time base.

In accordance with the present invention, a rockable or "seesaw" mechanical oscillator is provided. The oscillator carries a coil which is electrically connected, for example, by a pair of electrically isolated hairsprings, to an electronic circuit. The electronic circuit pulses the coil with driving current under the synchronizing control of a high frequency time base. Preferably the synchronizing signals are derived by an active dividing network from a crystal oscillatory circuit. The coil cooperates with one or more magnets fixed to the base to impulse the oscillator.

The oscillator supports, at its end opposite the coil, a spring member having index pins. The index pins index a sweep seconds wheel at a desired rate and maintain an accurate timepiece.

Other objectives of present invention will be apparent from the following detailed description giving the inventor's best mode of practicing the invention, the description being taken in conjunction with the accompanying drawings.

Figure 1:
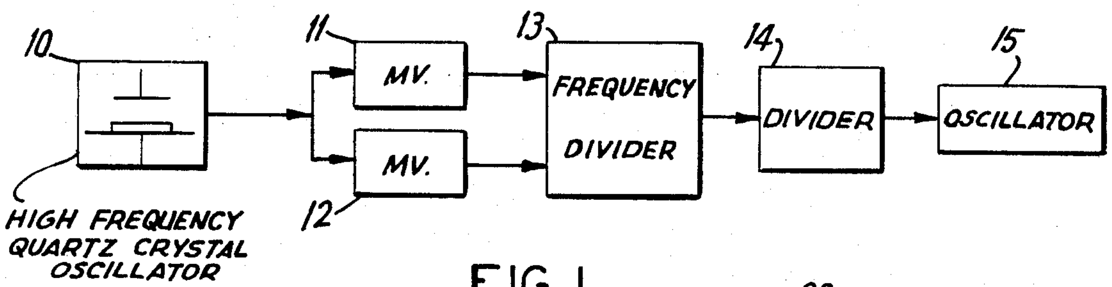
FIG. 1 is a block diagram illustrating the electrical circuit for achieving the desired synchronizing signal to be fed to the mechanical oscillator in accordance with this invention.

FIG. 1 depicts a high frequency quartz crystal oscillator 10, for example, of 9,000 cycles per second. coupled to a pair of parallel operated multivibrators 11, 12. The multivibrators 11 and 12 have different synchronized rates, for example, of 900 and 1000 cycles per second, respectively. This arrangement provides an accurate and controlled high resonant frequency signal to a frequency divider 13. Divider 13 operates when the output pulses of both oscillators 11, 12 appear at the same time at the inputs of divider 13. Divider 13 reduces its 100 cycles per second input to a 25 cycles per second output. The 25 cycle per second signal is used as a synchronizing signal for regulating the oscillating motion of the mechanical oscillator 15 of the invention.

Oscillator 15 includes an oscillating arm 16 pivotable on a shaft 17. One end of arm 16 has a member 18 fixed thereto. One end of a pre-loaded oscillator spring 19 is spaced from arm 16 and extends longitudinally toward shaft 17. The other end of spring 19 supports an inverted U-shaped yoke 20. Yoke 20 carries a pair of suitably spaced indexing pins or jewels 21, 22 for driving an index wheel 23. The index wheel 23 is supported for turning on a pivot bearing 24. Index wheel 23 has a tooth periphery 25 engaged at all times by at least one of the indexing pins 21, 22, whereby wheel 23 is turned in a counterclockwise direction at a desired rate and held against accidental rotation. Preferably the index wheel 23 is the seconds wheel of the movement.

Figure 2:
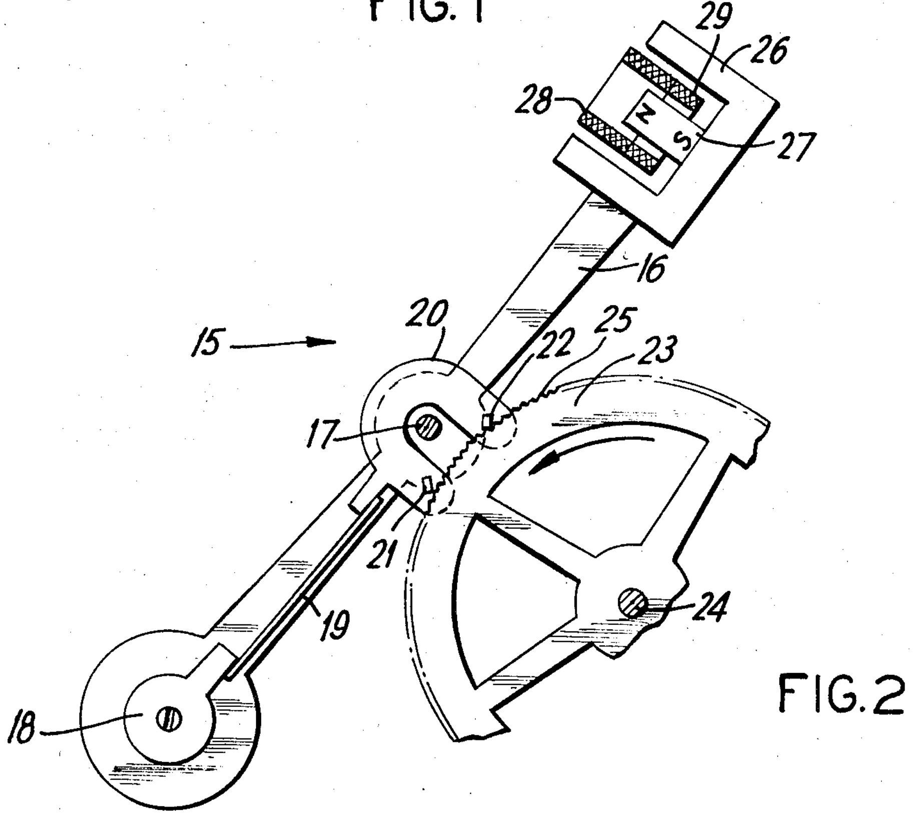
FIG. 2 is a front elevational plan view of a mechanical oscillator in accordance with the invention.
Figure 3:
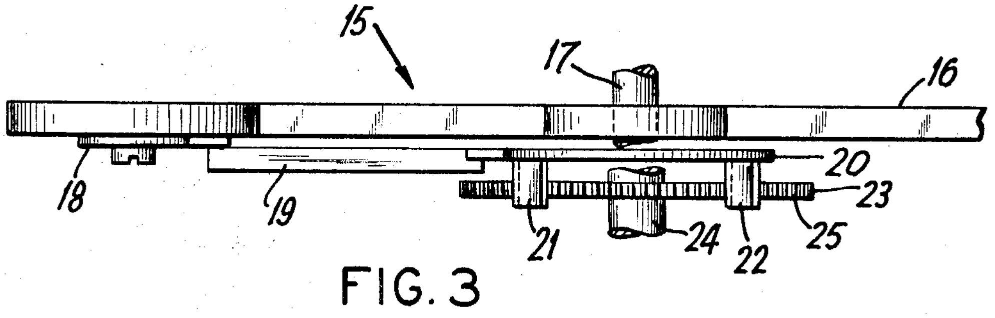
FIG. 3 is a fragmentary top elevation of the mechanical oscillator.

As seen in FIG. 2, the right end of arm 16 includes a housing shield 26 for supporting a drive magnet 27 which is designed to move into and out of surrounding and stationary supported driving and pick-up coils 28, 29. The driving coil 28 is energized by a power supply in the watch to impart a 5 cycle per second oscillation to arm 16 about its shaft 17. Pick-up coil 29 is coupled to the synchronizing signal from divider 14 to maintain arm oscillation accurately at 5 cycles per second. The mass of the entire arm assembly is suitably designed to produce a balanced oscillating arm 16.

Figure 4:
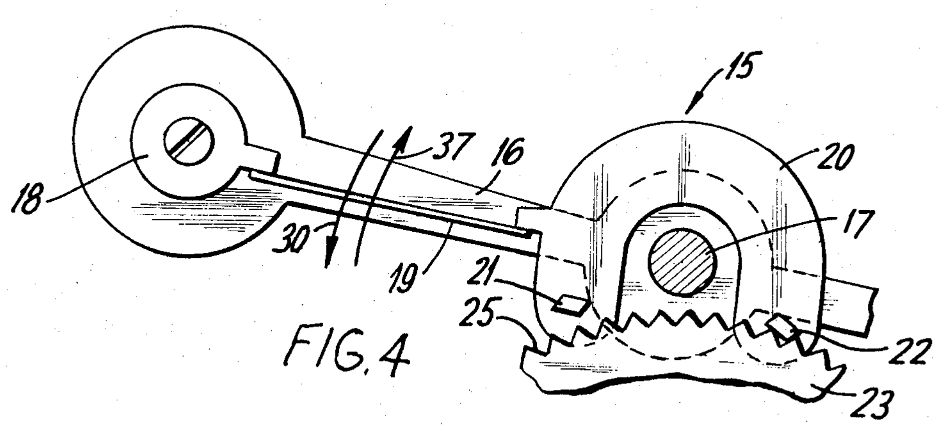
FIGS. 4–7 depict schematically the sequence of rockable motion of the oscillator in accordance with the invention.
Figure 5:
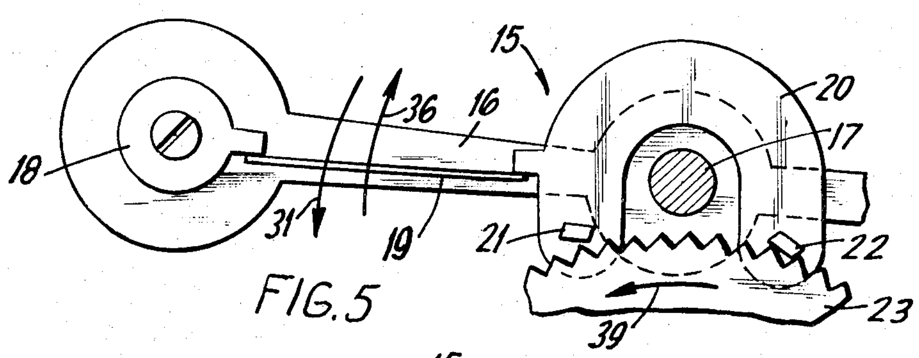
Figure 6:
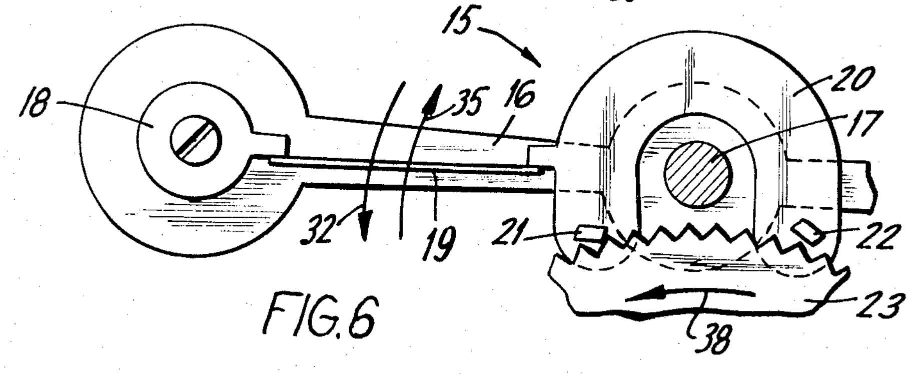
Figure 7:
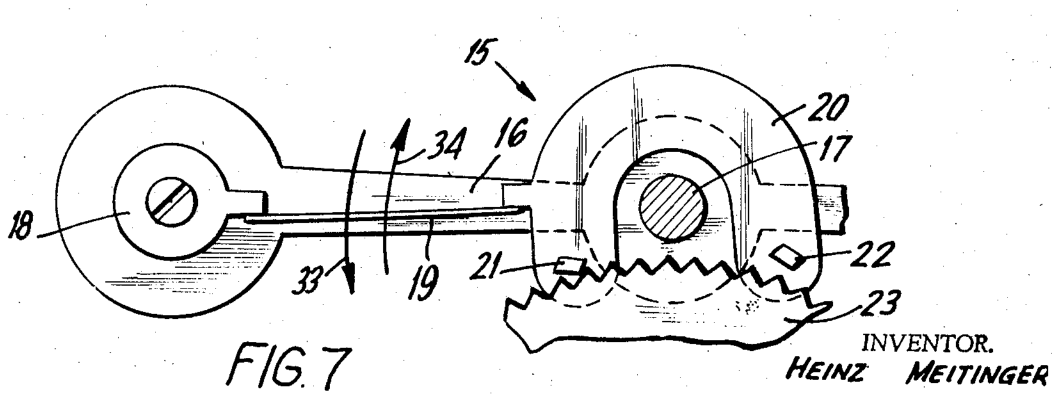

FIGS. 4 to 7 depict the sequence of the indexing opertion wherein arrows 30 through 33 illustrate the direction of turning of arm 16 during the driving interval of the cycle. Arrows 34 through 37 show the return motion of the arm 16. The sequence of FIGS. 7 to 4 depict the sequence by which the stress-loaded spring 19 returns arm 16 to its initial position of FIG. 4 to complete the cycle.

FIG. 4 illustrates the position of the arm 16, its pins 21, 22 and wheel 23, at the time the driving coil 28 is about to be energized to drive arm 16 counterclockwise. At the start of this cycle, the suitably pre-loaded spring 19 maintains pin 22 engaged to wheel 23. This arrangement prevents wheel back-turn. When the driving coil 28 is energized, magnet 27 is pulled into the coil and arm 16 is caused to turn counterclockwise, thus lowering its left end, as depicted by arrows 30, 31. Pin 21 approaches engagement with wheel 23 while pin 22 is not yet disengaged therefrom, FIG. 5. After pin 21 engages wheel 23, pin 22 lifts therefrom, whereby the wheel 23 is indexed counterclockwise, i.e., in the direction of arrow 38, FIG. 6. The spring 19 is now further stressed by reason of the relationship of the members. FIG. 7 depicts the fourth step of the sequence wherein driving coil 28 is de-energized, which allows the loaded spring 19 to return the arm 16 to its FIG. 4 position, as depicted by arrows 34 to 37.

In FIG. 6 pin 22 approaches wheel engagement, while pin 21 still retains its engagement. After the pin 22 engages the wheel 23, FIG. 5, pin 21 rises from the wheel, whereby the wheel 23 is indexed, arrow 39. FIG. 4 completes the cycle wherein coil 28 is again energized. The foregoing cycle corresponds to indexing wheel 23 one tooth per cycle.

The physical arrangement for the mechanical oscillator 15 is such that there is always at least one index pin 21, 22 in contact with the wheel teeth 25 to prevent back-drive of wheel 23. Both pins 21, 22 are attached relatively close together on the same U-shaped yoke 20. This arrangement eliminates the necessity of adjustments to the distance between pins 21, 22 and also reduces the accumulation of pitch tolerances. The sweep seconds wheel 23 is followed by a known minutes and hour gear train, not shown, in accordance with state-of-the-art practices.

As stated hereinbefore, the mechanical oscillator 15 is driven by a 5 c.p.s. (cycles per second) pulse fed to coil 28. This arrangement provides a relatively inexpensive timing oscillator. By nature of its design, oscillator 15 will rock faster than the desired rate of 5 c.p.s. However, to prevent a rocking deviation at a slower rate, that is, less than 5 c.p.s., oscillator 15 is synchronized by the 25 c.p.s. pulse applied to the synchronizing coil 29 from divider 14. The frequency ratio between these two signals is 5:1. During a single cycle of operation, the coil 28 is pulsed once while coil 29 receives five relatively small pulses. When oscillator 15 is rocking at its desired rate, the five suitably spaced small pulses appear along the time line of the overriding drive pulse of coil 28 so as not to interfere with the prescribed oscillation of arm 16. In other words, the synchronizing signal does not affect the rocking operation of the mechanical oscillator 15 when the latter is rocking at its prescribed rate. On the other hand, when the rocking oscillator 15 tends to slow down less than 5 c.p.s., the synchronizing pulse signals are misaligned in time with the drive pulse so as to add to the drive pulse. The effect is a composite pulse which increases the rate at which magnet 27 is pulled into the combination of coils 28, 29. As a result, arm 16 rocks at a faster oscillating rate until the five c.p.s. movement is achieved.

In operation, the pins (or jewels) 21, 22 have a rocking motion in regard to the index wheel 23. First one pin is within the teeth of the index wheel and is used as the fulcrum for the spring. Then the spring oscillates and brings the second pin within the teeth, causing the wheel to rotate. The second pin, which is then within the teeth, becomes the fulcrum for the spring.

Preferably, as shown in FIGS. 1–7, the spring 19 is the operative spring of the oscillator, causing it to return to a normal position. However, an auxiliary hairspring (not shown) may be used if the oscillator carries a coil, the auxiliary hairspring being an electrical conductor to the coil. Alternatively, a second spring, such as a hairspring, may be the main return spring for the oscillator and the spring 19 used only for indexing.

I claim:

1. In a horological instrument, an indexing system in which a low amplitude oscillator drives an index wheel, said system comprising a flat spring connected near one of its ends to said oscillator and cantilevered, the connected end of the spring being oscillated by movement of said oscillator, said spring not being pivoted by means of a staff, a carrier connected to said spring at a distance from the end connected to the said oscillator, and two jewels or pins fastened into said carrier, wherein the spring flexes so that one of the jewels or pins is always in the teeth of the index wheel and the rocking motion of the jewels or pins progresses the index wheel.

2. An indexing system as in claim 1 wherein the said spring is the return spring of the oscillator tending to move said oscillator toward a normal position.

3. An indexing system as in claim 1 wherein said carrier is a yoke-shaped member with the open side of the yoke facing the index wheel.

4. An indexing system as in claim 1 wherein said index wheel is the seconds wheel of the movement.

5. An indexing system as in claim 1 wherein said oscillator includes an arm fixed to a pivotable staff.

6. An indexing system as in claim 5 wherein said arm carries a magnet which cooperates with a coil fixed to a base and the oscillator is impulsed by said coil.

7. An indexing system as in claim 6 wherein the magnet is near one end of the arm and the spring is connected near the opposite end of the arm.

8. An indexing system as in claim 1 wherein said oscillator is electronically driven by an electronic drive circuit which is synchronized by a high-frequency time base.

9. An indexing system as in claim 8 wherein said high-frequency time base is a crystal oscillator.

10. An indexing system as in claim 1 wherein the operative portion of the jewels or pins in cross-section viewed along the axis of the index wheel, is triangular in shape.

11. A mechanical oscillator for turning a timing wheel of a horological device comprising, a rockable oscillator arm pivotable intermediate its ends, means at one side of the oscillator pivot for periodically driving the oscillator, a spring supported by said oscillator arm in cantilever fashion at the other side of its pivot, a pair of closely spaced indexing pins supported at the free end of said cantilevered spring, and a turnable timing wheel engageable at all times by at least one of said pins, said arm being rocked in one direction by said driving means for causing a disengaged one of said pins to engage said wheel and to index the wheel upon the other pin of said pair being disengaged from the wheel, the foregoing travel of the arm also loading said spring with a force for rockably returning said arm to its initial status upon release of said driving means, said loaded spring rocking said arm in a return direction for causing the disengaged one of said pins to engage said wheel and to index said wheel upon said other pin being disengaged from said wheel.

12. Apparatus in accordance with claim 11 wherein said spring carrying a U-shaped member extends over the pivotal axis of said arm, respective ones of said index pins being carried by opposite ones of the legs of said U-shaped member.

13. An electrical horological device in accordance with claim 11, further including a first element comprising a current carrying coil, and a second element comprising a magnet, said drive means including one of said elements, the other of said elements being supported adjacent thereto, whereby said magnet and coil move relatively to each other in response to a change of electrical energization of said coil.

14. An electrical horological device in accordance with claim 11, further including a current carrying coil having a hollow core, means for pulsing the said coil with a signal for rocking said oscillator in one direction, means for pulsing the said coil with a synchronizing pulse signal for regulating the frequency of oscillation of said arm, said drive means including a magnet supported by said oscillator for travel into and out of said coil core.

15. Apparatus in accordance with claim 11 wherein said spring extends lengthwise and is spaced from said arm from the point of support thereon.

References Cited

UNITED STATES PATENTS 3,446,007 5/1969 Cohen ---------------- 58—116

RICHARD B. WILKINSON, Primary Examiner

E. C. SIMMONS, Assistant Examiner

U.S. Cl. X.R.

58—28, 116, 121